United States Patent Office 3,109,841
Patented Nov. 5, 1963

3,109,841
BLEACH-FAST, FIBER-REACTIVE ORANGE TO RED DIAZO DYES
William Henry Gumprecht and Donald John Reif, Wilmington, Del., assignors to E. I. du Pont de Nemours and Company, Wilmington, Del., a corporation of Delaware
No Drawing. Filed July 31, 1959, Ser. No. 830,733
5 Claims. (Cl. 260—153)

This invention relates to novel bleach-fast azo dyes and to novel intermediates particularly adapted for their production. It is an object of this invention to provide bleach-fast azo dyes in the range of shades outside the customary yellows, for instance, in the range of orange to red. Other objects and achievements of this invention will become apparent as the description proceeds.

Bleach-fast azo dyes in the ranges of red and blue are practically unknown. By bleach-fastness throughout this specification and claims we mean fastness to aqueous alkaline hypochlorite, particularly fastness to standard bleach test No. IV of A.A.T.C.C. (Technical Manual of A.A.T.C.C., vol. XXXIV, page 85). Hitherto known bleach-fast azo dyes are generally of a shade in the range of yellow to brown.

As a general rule, the shade of a color, particularly an azo color, can be modified by inserting in the molecule auxochrome groups, particularly hydroxy and basic amino groups. These groups, however, are generally recognized as groups which tend to increase the sensitivity of a given color toward alkaline hypochlorite; consequently, their introduction into an azo dye tends to weaken its bleach-fastness.

Now, this invention is based on the surprising discovery that if the radical

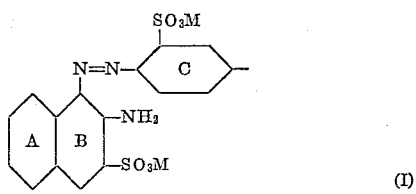
(I)

(wherein M is a cation and the aromatic nuclei A and C may bear other substituents exclusive of a certain limited group as defined below) is introduced into an azo dye, the color of the latter may be shifted into the range of orange to red without affecting its bleach fastness. In other words, if the azo dye does not contain elsewhere groups which are sensitive to bleach, such as hydroxy and basic amino groups, the resulting dye is fast to bleach.

This observation is particularly surprising, for we found that if the NH$_2$ in configuration (I) above is shifted to some other position or if it is replaced by OH, the resulting azo colors are fugitive to bleach. (I.e., they may undergo a change of shade under the action of alkaline hypochlorite, or may lose their color altogether.) Furthermore, if the position of one or the other of the SO$_3$M groups in said configuration is shifted, or if there is only one SO$_3$M group present, the resulting azo colors are no longer fast to bleach.

Yet, we find, that the radical of Formula I may be further substituted in the rings marked A and C, provided the substituents do not consist of or contain radicals, such as OH or basic amino, which tend to weaken the bleach-fastness of the color. It seems therefore that the particular atomic configuration represented by Formula I has the peculiar property of diminishing the sensitivity of the NH$_2$ group toward oxidation while never-theless not interfering with its auxochromic effect on the shade of the color.

This hypothesis finds further confirmation in our further discovery that the nitroazo compound of formula

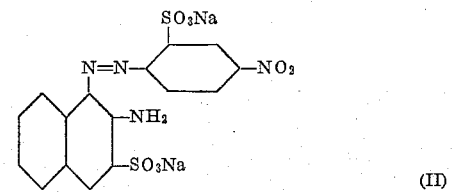
(II)

which may be considered as one of the simplest azo compounds having said configuration (I), does not become converted into a naphthotriazole compound under the action of alkaline hypochlorite or alkaline cuprammonium salts according to standard procedure, whereas the two closely related compounds which have but one of the two SO$_3$Na groups shown in Formula II are readily oxidized under these conditions to the corresponding naphthotriazoles. (Fr. Patent 1,064,637, Examples 1 and 4).

Now, the manners in which we utilize the above basic discovery for the production of novel bleach-fast azo dyes in color ranges other than yellows are numerous, and are typified by the following several procedures.

I. Starting with a nitroazo compound of general Formula II above, which may be produced by coupling diazotized 4-nitroaniline-2-sulfonic acid or a nuclear substitution derivative thereof to 2-naphthylamine-3-sulfonic acid or a substitution derivative thereof, within the limits above pointed out, we may reduce the same to produce the corresponding aminoazo compound of general formula

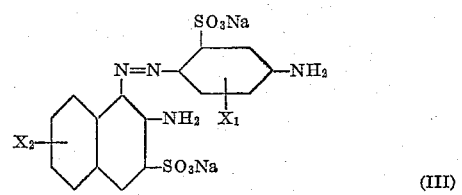
(III)

wherein X$_1$ and X$_2$ represent respectively whatever additional substituents occur in the phenyl and naphthyl nuclei. Or we may start with a 4-acetylamino-aniline-2-sulfonic acid, and after diazotization and coupling as above to a 1-free-2-naphthylamine-3-sulfonic acid, hydrolyze off the acetyl group to produce compound (III).

Compound (III) may then by diazotized and coupled to a coupling component which is free of bleach-sensitive substituents, but possesses one NHZ group, Z being CH$_3$ or C$_2$H$_5$, the coupling then being followed by an operation whereby to replace the H-atom of the NHZ group by an acyl radical or by a fiber-reactive link.

The resulting colors are then applicable, respectively, as direct dyes to cotton or as fiber-reactive dyes to any fiber which possesses OH, NH$_2$ or NH radicals, and produces thereon red dyeings, fast to hypochlorite bleach.

For instance, one may choose as coupling component an N-methyl or N-ethyl aniline, whereby an intermediate disazo dye is obtained of formula

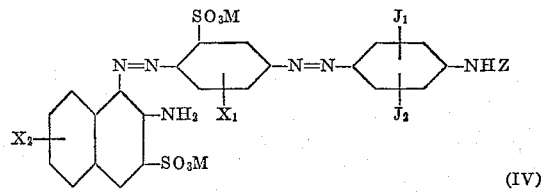
(IV)

wherein Z is CH₃ or C₂H₅, while X₁, X₂, J₁ and J₂ are optional substituents, as defined hereinbelow.

In the subsequent replacement reaction, then one may choose an acylating agent, for instance benzoyl chloride, whereupon a compound of Formula V is produced:

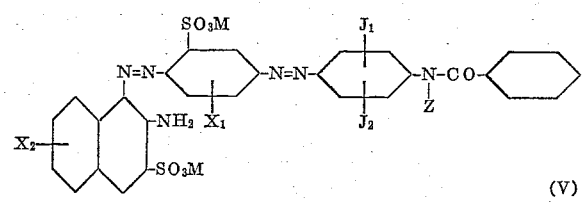

(V)

This product will dye cotton from a neutral aqueous dye bath in red shades fast to light and to hypochlorite bleach.

Or one may choose for the replacement reaction cyanuric chloride or a dichlorotriazine of formula

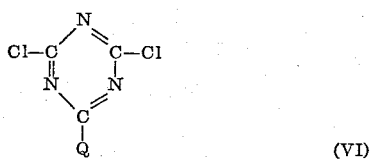

(VI)

wherein Q stands for hydroxy, amino, mono-, or dialkylamino, mono- or bis-hydroxyalkyl-amino, arylamino, N-alkylarylamino, alkoxy, aryloxy, thioalkyl, thioaryl, sulfonated or carboxylated derivatives of these, etc.

The resulting disazo dye is then a fiber-reactive dye, by virtue of the one or two labile Cl-atoms which it possesses (i.e. Cl-atoms attached to a triazine ring).

It will be noted here that substituent Q in the triazine ring may possess hydroxy or basic amino radicals, because these being in a portion of the dye molecule insulated from the chromophore, will not affect the shade of the color if they should react with an oxidizing agent. Consequently, such radicals are not considered as bleach-sensitive, insofar as the whole dye molecule is concerned.

If desired, the diazotized compound (III) above may be coupled to a coupling component which does possess a free NH₂ group, but is otherwise free of bleach-sensitive substituents. The resulting disazo amino compound may then be diazotized and coupled to a coupling component possessing an NHZ group as above (but being otherwise free of bleach-sensitive substituents). The trisazo compound thus obtained may then be treated as above to replace the H of the NHZ group by an acyl radical or a fiber-reactive link. The same idea can, of course, be extended to produce a tetrakisazo or higher polyazo compound having on the final component an NZ group which is further attached to an acyl group or a fiber-reactive link.

II. We may start with a sulfo-anilino compound of formula

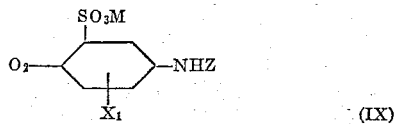

(IX)

wherein Z is methyl or ethyl and react the same with a cyanuric halide, an aryl chloroformate, or any other fiber-reactive link to produce a bleach-fast, fiber-reactive dye, applicable to cotton, wool, silk, nylon, etc.

III. Starting with a disazo compound of Formula IV, prepared as in procedure (I), one may react 2 moles of the same with 1 mole of cyanuric chloride at two temperature stages, namely 0° to 5° C. in the first stage and 20° to 70° C. in the second stage. The reaction product in this case is a fiber-reactive tetrakisazo dye of the formula

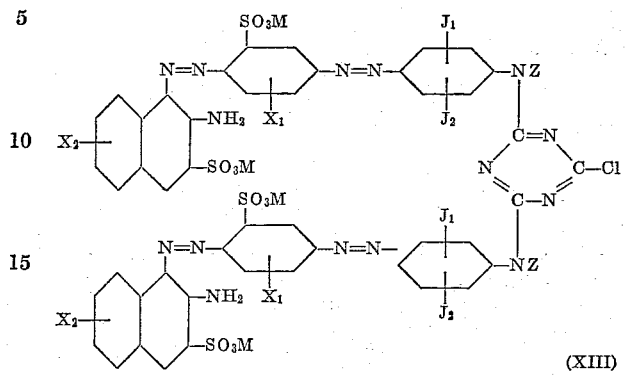

(XIII)

wherein the symbols Z, M, X₁, X₂, J₁ and J₂ have the same meaning as above.

The colors thus produced are applicable by standard fiber-reactive dye procedure to cotton, wool, nylon, or any other fiber which possesses in its structure OH, NH or NH₂ radicals, and produce thereon red dyeings fast to light and to bleach.

Without limiting this invention, the following examples are given to illustrate our preferred mode of operation. Parts mentioned are by weight.

Example 1

A diazonium solution is prepared by adding 60 parts of 10 N hydrochloric acid to a solution of 43.6 parts of 4-nitroaniline-2-sulfonic acid and 15.2 parts of sodium nitrite in 1000 parts of water at 0° to 5° C. After stirring for one hour at 0° to 5° C., the excess nitrous acid is removed with sulfamic acid. In another vessel, 61.2 parts of 2-naphthylamine-3,6-disulfonic acid are slurried in 350 parts of water at 0° to 5° C., and hydrochloric acid is added until the mass is acid to Congo red paper. The slurry is then added to the diazonium solution, and the mixture is allowed to warm to room temperature while stirring. The product is isolated by adjusting to pH 6.5 with sodium hydroxide solution, adding sufficient NaCl at 50° to 60° C. to produce a 15% NaCl solution and filtering. The press cake dissolves in water to give a red solution. It constitutes the trisodium salt of 1 - (4' - nitrophenylazo) - 2 - naphthylamine - 2',3,6 - trisulfonic and, and may be represented by the formula

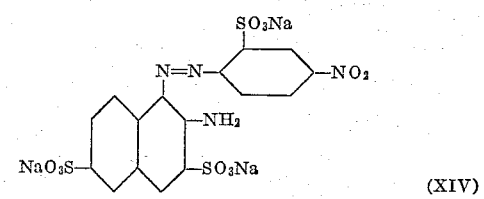

(XIV)

This product is useful as an intermediate for the examples which follow, but it can also be used as an acid dye for wool, dyeing the same in attractive red colors.

Disulfonates, trisulfonates and tetrasulfonates of similar properties to the above trisodium compound may be obtained by replacing the 61.2 parts of 2-naphthylamine-3,6-disulfonic acid, respectively, by 45.1 parts of 2-naphthylamine-3-sulfonic acid, 61.2 parts of 2-naphthylamine-3,7-disulfonic acid or 77.4 parts of 2-naphthylamine-3,5,7-trisulfonic acid.

Likewise, the 43.6 parts of 4-nitroaniline-2-sulfonic acid in the above example may be replaced by 50.5 parts of 5-chloro-4-nitroaniline-2-sulfonic acid, 49.6 parts of 5-methoxy-4-nitroaniline-2-sulfonic acid or 59.6 parts of 4- nitroaniline-2,5-disulfonic acid. The resulting nitroazo intermediates correspond, respectively, to the formulas

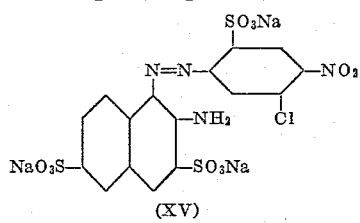

(XV)

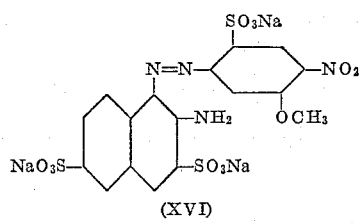

(XVI)

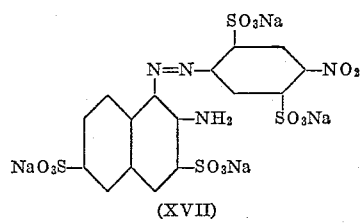

(XVII)

*Example 2*

A solution is prepared by dissolving the press cake of Example 1 in 1500 parts of water at 60° to 70° C. and adjusting the pH to 9 with sodium hydroxide solution. 17.2 parts of 60% sodium sulfide flakes (representing 9.7 parts of sodium sulfide) are then added and the mass is stirred at 65° to 70° C. for 15 minutes, maintaining a positive sodium nitroprusside test for excess sulfide throughout this period by adding sodium sulfide as needed. The product is isolated by adjusting the pH to 7 with hydrochloric acid, adding sufficient NaCl at 50° to 60° C. to produce a 20% NaCl solution, allowing to cool to room temperature while stirring, then filtering and drying. It is a brown powder which dissolves in water to give an orange solution. Its constitution corresponds to the formula

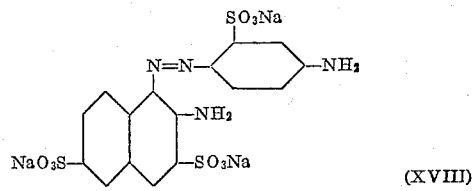

(XVIII)

and the color may be designated as the trisodium salt of 1-(4′-aminophenylazo)-2-naphthylamine-2′,3,6-trisulfonic acid.

*Example 3*

28.4 parts of the trisodium salt of 1-(4′-aminophenylazo)-2-naphthylamine-2′,3,6-trisulfonic acid from Example 2 and 3.8 parts of sodium nitrite are dissolved in 500 parts of water at 0° to 5° C., and 15 parts of 10 N hydrochloric acid are added. After stirring for one hour at 0° to 5° C., the excess nitrous acid is destroyed with sulfamic acid. To the resulting diazo solution, maintained at 0° to 5° C., 5.4 parts of N-methylaniline are added and the mixture is stirred for one hour at 0° to 5° C.; the pH is adjusted to 2.5 with sodium hydroxide solution; and the mass is stirred until it warms up to room temperature. The product may be isolated by salting out at pH 6.5, filtering, washing and drying.

The disazo dye thus produced corresponds to the formula

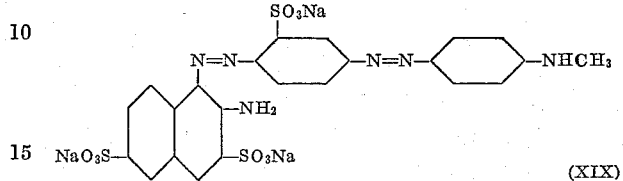

(XIX)

It is a deep green powder, dissolving in water to a red solution. It can be used per se as a direct dye for cotton or as an acid dye for wool, producing thereon bluish red dyeings fast to light.

*Example 4*

15.2 parts of sodium metanilate are dissolved in 150 parts of water, and adjusted to pH 3 with hydrochloric acid. To this solution, at 0° to 5° C., a solution of 13.9 parts of cyanuric chloride in 61 parts of acetone is added. To the resulting slurry, at 0° to 5° C., are added 38 parts of 2 N sodium carbonate, so as to maintain the pH at 2 to 3. The resultant solution of the primary condensation product of sodium metanilate and cyanuric chloride is added to the slurry of disazo dye (XIX) prepared in Example 3, which is first adjusted to pH 6.5 and heated to 45° to 50° C. Sodium carbonate solution is fed in as needed to maintain the pH at 4 to 6, until the pH remains constant for 15 minutes. The slurry is then adjusted to pH 6.5 with sodium hydroxide solution, and sufficient NaCl is added at 50° to 55° C. to produce a 20% NaCl solution. The product is filtered off at room temperature and dried. The isolated red product is a fiber-reactive dye, and is believed to have the structure,

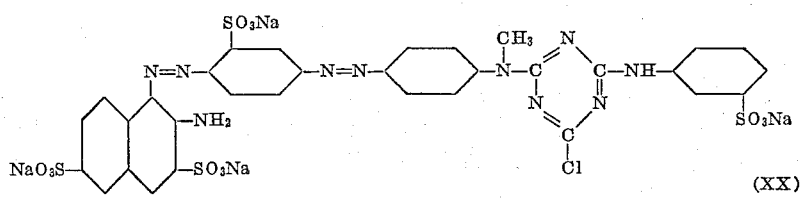

(XX)

It is a black powder which dissolves in water to give a red solution. When applied to cotton broadcloth by the method described in Example 8 hereinbelow, it exhibits a red shade having good light and wash fastness and outstanding fastness to chlorine bleach and peroxide, and being readily discharged in neutral media.

Fiber-reactive dyes of similar color and fastness qualities are obtained if in lieu of the monoazoamine trisulfonate used as initial material in the above example, one starts with the corresponding aminoazo dyes derived by reducing the alternative disulfo, trisulfo and tetrasulfo nitroazo dyes indicated at the end of Example 1. When the initial nitroazo intermediate contains chlorine, methoxy or sulfo in the nitrophenyl nucleus, a color of essentially the same properties is obtained.

In lieu of N-methylaniline as coupling component in the above example, one may use, with essentially equal results, any of the following: N-ethylaniline, o- or m-chloro-N-methylaniline, o- or m-methoxy-N-methylaniline, the corresponding chloro or methoxy N-ethylanilines, N-methyl- or N-ethyl o-toluidine, N-methyl or N-ethyl-m-toluidine, N-methyl-2,5-xylidine, etc.

Again, in the primary condensation product of cyanuric chloride, with an aromatic amine, the sodium metanilate above specified may be replaced by aniline 2,5-disulfonic acid, or by anthranilic acid, or by any water-soluble salt thereof. Or one may use the sodium salt of 1-naphthylamine-4-, 5- or 8-monosulfonic acid. Or one may use a phenol or thiophenol which contains a sulfo or carboxy group in any of the o-, m- or p-positions.

*Example 5*

34.4 parts of the dried diasazo dye (XIX) obtained in Example 3 are dissolved in 500 parts of N,N-dimethylacetamide at 0° to 5° C. To this solution at 0° to 5° C. is added over a period of ½ hour, 8.1 parts of phenyl chloroformate, and the resultant mixture is allow to warm to room temperature and stir for 24 hours. The mixture is then stirred into 500 parts of water. The resultant solution is adjusted to pH 4 with sodium hydroxide solution, and sufficient NaCl is added to produce a 20% NaCl solution. The product is filtered off and dried.

The isolated red product is a fiber-reactive dye, and is believed to have the structure:

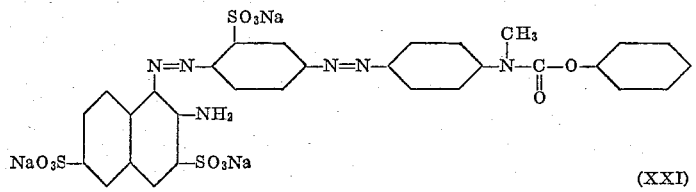

(XXI)

It is a brown powder which dissolves in water to give a red solution. When applied to cotton broadcloth by the method described in Example 10, it produces a red dyeing of a yellower shade than the dye of Example 4, and the dyeing has good light and wash fastness and outstanding fastness to chlorine bleach.

Fiber-reactive dyes of similar color and fastness qualities are obtained if in lieu of the phenyl chloroformate in the above example, one starts with the corresponding stoichiometric quantity of o-methoxyphenyl chloroformate, p-carbomethoxy-phenyl chloroformate, o- or p-nitrophenyl chloroformate, o- or p-chlorophenyl chloroformate, o- or p-tolyl chloroformate or p-sulfophenyl chloroformate.

*Example 6*

The procedure of Example 3 is repeated down to the point of producing an aqueous slurry of the disazo dye of Formula XIX. To this slurry, maintained at 0° to 5° C., 9.25 parts of cyanuric chloride in 40.5 parts of acetone are added, and the mixture is stirred, while adding sodium carbonate solution as needed to maintain the pH between 4 and 6, until the pH remains constant for 15 minutes. The mixture is then warmed to room temperature, and the color is filtered off and dried. It is a black powder, and corresponds in constitution to the formula

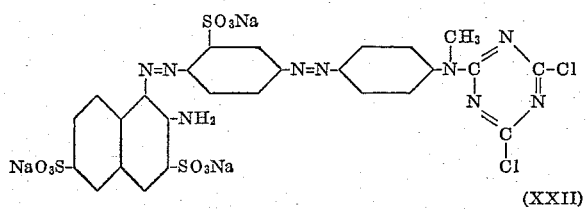

(XXII)

When applied to cotton broadcloth by the procedure set forth below in Example 9, it produces dyeings of similar qualities to those obtained with the product of Example 4.

*Example 7*

The procedure of Example 6 is repeated to the end, except for filtering off the final dye. 4.65 parts of aniline are then added, and the mass is stirred at room temperature while adding sodium carbonate solution as needed to maintain the pH between 4 and 6, until the pH remains constant for 15 minutes. Upon filtering off and drying, a color of essentially the same properties as those of the product of Example 4 is obtained. Its constitution corresponds to Formula XX except that it contains no $SO_3Na$ group in the phenyl radical on the extreme right.

In lieu of aniline in this example, other arylamines or alkylamines may be employed, for instance o-, m- or p-toluidine, the corresponding N-methyl and N-ethyl derivatives, methylamine, ethylamine, propylamine, diethanolamine, monoethanolamine, 3-methoxypropylamine, etc. If desired, ammonia itself may be used in lieu of aniline. Or again, the dichloro compound (XXII) of Example 6 may be reacted at room temperature with a lower alcohol such as methyl ethyl or butyl alcohol or with a lower alkyl mercaptan, such as ethyl or propyl mercaptan, or with phenol, thiophenol, salicylic acid, p-amino-salicylic acid, or p-phenol sulfonic acid, and the like. In all such cases, provided the temperature is maintained in the range of 20° to 70° C., one and only one of the 2 Cl-atoms on the triazine ring is replaced by a radical Q corresponding to the reactant selected (i.e. Q is the radical of an arylamine, alkylamine, alcohol, etc.).

*Example 8.—Dyeing Procedure*

An aqueous solution of a dye having a monochlorotriazine radical as fiber-reactive link (for instance, the product of Formula XX above; concentration in dye bath, optional, say 0.5 to 8%) is padded on cotton broadcloth at 70° C. in such a manner that the increase in weight by the fabric is 60%. After the fabric is dried it is re-padded in the same manner with a solution which contains 25% sodium chloride and 1.2% sodium hydroxide. The wet fabric is steamed for two minutes and then scoured at the boil for two minutes with a solution containing 0.3% sodium carbonate and 0.2% of the condensation product of 20 moles of ethylene oxide with one mole of octadecyl alcohol (a non-ionic detergent), rinsed and dried.

*Example 9.—Dyeing Procedure*

If the reactive dye contains a dichlorotriazine radical (e.g. the product of Example 6 above), the dyeing procedure is the same as in Example 8 except that the dye solution is padded on to the fiber at room temperature (20° to 25° C.).

*Example 10.—Dyeing Procedure*

A pad bath solution is prepared from 0.25 to 2 parts of the dye of Example 5, 4 parts of N,N-dimethylacetamide, 2 parts of a 35% solution of benzyltrimethylammonium hydroxide in methanol, and 19 parts of water. Mercerized cotton broadcloth is padded with the solution in such a manner that the increase in weight by the fiber is 60%, and is dried at room temperature. The fabric is then heated at 150° to 160° C. for 10 minutes. It is then scoured at the boil for 2 minutes with a solution containing 0.3% sodium carbonate and 0.2% of the same condensation product as in Example 8, rinsed and dried.

It will be understood that the details of the above procedures and examples may be varied widely within the skill of those engaged in this art.

In particular, the symbol $X_2$ (the substituent on ring A of the basic phenylazo-naphthylamine configuration) may be chosen to have any of the following values: hydrogen, halogen (F, Cl, Br), $SO_3M$ (M a water-solubilizing cation), alkyl of 1 to 4 C-atoms, or COOH. In certain cases, as when $X_2$ is $SO_3M$, there may be two such substituents on ring A.

The symbol $X_1$ (the substituent on ring C of the basic configuration) may be chosen to have any of the values listed under $X_2$, as well as alkoxy (1 to 4 C-atoms).

The symbol $J_2$ may have the values: hydrogen, alkyl of 1 to 4 C-atoms, and alkoxy of 1 to 4 C-atoms, while $J_1$ may be an atom or radical of the same group as well as halogen (F, Cl, Br).

Z is a lower alkyl radical, preferably methyl or ethyl.

M is any cation capable of neutralizing a sulfonic acid group, including water-solubilizing cations, such as H, K, Na, $NH_4$, and water-insolubilizing cations such as Ca, Ba, Mg or Al.

The substituent Q on the triazine ring wherever it is shown above may have any of the following values: halogen (F, Cl or Br), OH, SH, O-alkyl, S-alkyl, O-aryl, S-aryl, primary amino, monoalkylamino, dialkylamino, monoalkanolamino, dialkanolamino, arylamino, N-alkyl-arylamino, hydroxy-arylamino, and particularly any of the aforegoing radicals which bear water-solubilizing groups such as sulfo or carboxy, the alkyls and alkanols aforementioned being radicals of 1 to 4 C-atoms each and the aryls being aromatic radicals of not more than 10 C-atoms in their cyclic structure.

Summarizing the aforegoing discussion and taking into consideration the definitions of $X_1$, $X_2$, $J_1$, $J_2$, Z and M above set forth as well as the several procedures I to III indicated in the introductory parts of this specification, the novel series of compounds opened up by our invention may be defined by the general formula

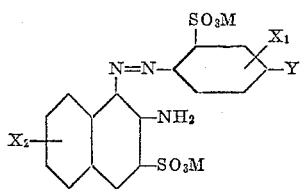

(XXIII)

wherein Y may be:

(a) A radical of form NZ wherein the N-atom is further attached to a fiber-reactive link such as a monohalogeno or dihalogeno triazine radical or the CO—OR radical of an aryl carbamate (procedure II);

(b) A radical of form N=N—R, wherein R is the radical of any compound capable of acting as an azo coupling component, and may contain additional azo groups or NZ-acyl, NZ-triazinyl, NZ-(alkoxy- or aryloxy-carbonyl), etc., groups (procedure I, especially in view of Formulas IV, V and VI).

In all the variations above it will be noted that, with a view to assuring resistance to oxidation with hypochlorite in the compound of said general formula, the definition of Y excludes the presence of hydroxy and basic amino groups except where such are separated from the chromophore part of the molecule by acyl radicals such as CO, $SO_2$ or part of a triazine ring, as for instance when one selects p-amino-salicylic acid in lieu of aniline in Example 7.

It will be clear from the aforegoing that our invention enables us to produce a wide variety of azo colors in the fields of orange and red, which are characterized by outstanding fastness to bleach, and which may be applied to various textile fibers and by various modes of application. For instance, they can be applied as direct dyes to cotton, as acid dyes to wool, or as fiber-reactive dyes to any fiber which possesses in its structure the requisite links, namely OH, NH or $NH_2$ radicals. Our novel colors may also be applied by printing methods. Finally, the sulfo groups can be insolubilized by choosing as M barium, calcium or aluminum, whereby the color becomes converted into an oxidation-stable lake, suitable for use in colored lacquers, varnishes and the like.

We claim as our invention:

1. A compound of the formula

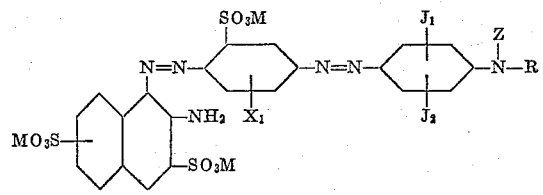

wherein $X_1$ is a substituent selected from the group consisting of H, Br, Cl, $SO_3M$ and alkoxy of 1 to 4 carbons; $J_2$ is selected from the group consisting of H, alkyl of 1 to 4 carbons and alkoxy of 1 to 4 carbons; $J_1$ is selected from those substituents as herein defined for $J_2$ and, in addition from F, Cl, and Br; M is a water solubilizing cation, and Z is an alkyl radical of not more than 2 carbon atoms; R is selected from the group consisting of

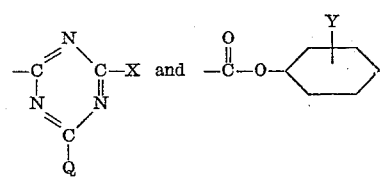

wherein X is a member selected from the group consisting of Cl and Br; Q is a member selected from the group consisting of Cl, Br, OH, SH, O-alkyl, S-alkyl, O-aryl, S-aryl, $NH_2$, monoalkylamino, monoalkanolamino, arylamino, N-alkylarylamino, hydroxyarylamino, sulfophenol, carboxyphenol, sulfothiophenol, and carboxythiophenol, said alkyl and alkanol radicals being of 1 to 4 carbons, each of said aryls having not more than 10 carbon atoms in their cyclic structure; and Y is selected from the group consisting of H, —$OCH_3$, —$COOCH_3$, $NO_2$, Cl, $CH_3$ and $SO_3H$.

2. A compound of the formula

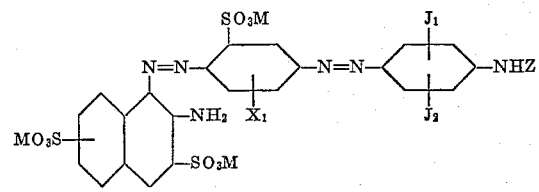

wherein $X_1$ is a substituent selected from the group consisting of H, Br, Cl, $SO_3M$ and alkoxy of 1 to 4 carbons; $J_2$ is selected from the group consisting of H, alkyl of 1 to 4 carbons and alkoxy of 1 to 4 carbons; $J_1$ is selected from those substituents as herein defined for $J_2$ and, in addition from F, Cl and Br; M is a water solubilizing cation, and Z is an alkyl radical of not more than 2 carbon atoms.

3. The disazo, fiber-reactive dye of the formula

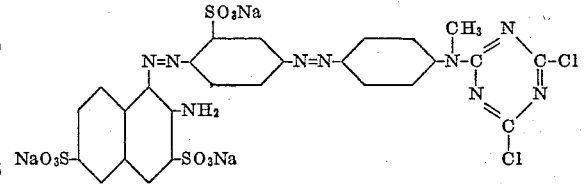

4. The disazo, fiber-reactive dye of the formula

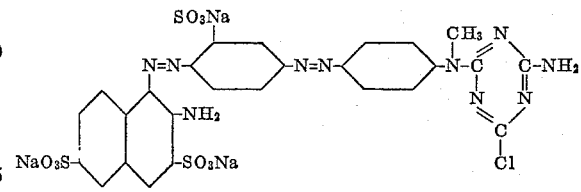

5. The disazo, fiber-reactive dye of the formula
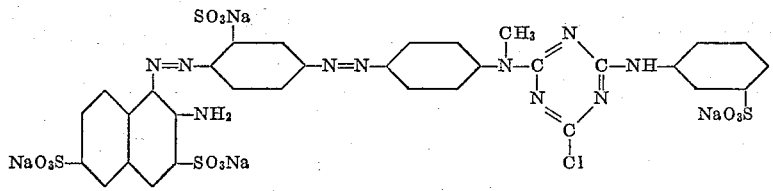
References Cited in the file of this patent
UNITED STATES PATENTS
| | | |
|---|---|---|
| 921,105 | Gunther et al. | May 11, 1909 |
| 2,860,128 | Gunst | Nov. 11, 1958 |